(12) United States Patent
Cohen

(10) Patent No.: US 10,463,961 B2
(45) Date of Patent: Nov. 5, 2019

(54) INTERACTIVITY WITH A MIXED REALITY

(71) Applicant: Nant Holdings IP, LLC, Culver City, CA (US)

(72) Inventor: Ronald H. Cohen, Pasadena, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 431 days.

(21) Appl. No.: 14/070,571

(22) Filed: Nov. 3, 2013

(65) Prior Publication Data

US 2014/0059437 A1 Feb. 27, 2014

Related U.S. Application Data

(60) Division of application No. 12/505,726, filed on Jul. 20, 2009, now Pat. No. 8,633,946, which is a
(Continued)

(51) Int. Cl.
*G06F 3/16* (2006.01)
*A63F 13/52* (2014.01)
(Continued)

(52) U.S. Cl.
CPC ............. *A63F 13/52* (2014.09); *A63F 13/10* (2013.01); *A63F 13/12* (2013.01); *A63F 13/213* (2014.09); *A63F 13/25* (2014.09); *A63F 13/323* (2014.09); *A63F 13/332* (2014.09); *A63F 13/65* (2014.09); *A63F 13/655* (2014.09); *G06F 3/0484* (2013.01); *G06F 3/167* (2013.01); *G06T 15/00* (2013.01); *G06T 19/00* (2013.01); *G06T 19/006* (2013.01); *G09G 5/18* (2013.01); *G09G 5/377* (2013.01); *H04N 21/4223* (2013.01); *H04N 21/6582* (2013.01); *A63F 13/06* (2013.01); *A63F 2300/1093* (2013.01);
(Continued)

(58) Field of Classification Search
CPC .......... G06T 19/006; G06F 3/167; G06F 3/16
See application file for complete search history.

(56) References Cited

U.S. PATENT DOCUMENTS 5,241,671 A 8/1993 Reed et al.
5,317,689 A 5/1994 Nack et al.
(Continued)

FOREIGN PATENT DOCUMENTS

EP 0967574 A2 12/1999
EP 1424111 A2 6/2004
(Continued)

OTHER PUBLICATIONS

Rosenberg L., "A Method and Apparatus for an On-screen/Off-screen First Person Gaming Experience," Mar. 31, 2005.
(Continued)

*Primary Examiner* — Anil N Kumar
(74) *Attorney, Agent, or Firm* — Fish IP Law, LLP

(57) ABSTRACT

Methods of interacting with a mixed reality are presented. A mobile device captures an image of a real-world object where the image has content information that can be used to control a mixed reality object through an offered command set. The mixed reality object can be real, virtual, or a mixture of both real and virtual.

21 Claims, 2 Drawing Sheets

US 10,463,961 B2
Page 2

Related U.S. Application Data continuation of application No. 11/972,062, filed on Jan. 10, 2008, now Pat. No. 7,564,469, which is a continuation-in-part of application No. PCT/US2006/033811, filed on Aug. 29, 2006.

(60) Provisional application No. 60/712,590, filed on Aug. 29, 2005.

(51) Int. Cl.

| | |
|---|---|
| A63F 13/332 | (2014.01) |
| A63F 13/655 | (2014.01) |
| A63F 13/213 | (2014.01) |
| A63F 13/40 | (2014.01) |
| A63F 13/30 | (2014.01) |
| H04N 21/4223 | (2011.01) |
| H04N 21/658 | (2011.01) |
| G06T 19/00 | (2011.01) |
| G09G 5/377 | (2006.01) |
| G06F 3/0484 | (2013.01) |
| G06T 15/00 | (2011.01) |
| G09G 5/18 | (2006.01) |
| A63F 13/323 | (2014.01) |
| A63F 13/25 | (2014.01) |
| A63F 13/65 | (2014.01) |
| H04M 1/725 | (2006.01) |
| A63F 13/20 | (2014.01) |

(52) U.S. Cl.
CPC . *A63F 2300/538* (2013.01); *A63F 2300/5573* (2013.01); *A63F 2300/6018* (2013.01); *A63F 2300/695* (2013.01); *A63F 2300/8082* (2013.01); *A63F 2300/8094* (2013.01); *H04M 1/72544* (2013.01); *H04M 2250/52* (2013.01)

(56) References Cited

U.S. PATENT DOCUMENTS

| | | | |
|---|---|---|---|
| 5,576,950 A | 11/1996 | Tonomura et al. | |
| 5,625,765 A | 4/1997 | Ellenby et al. | |
| 5,742,521 A | 4/1998 | Ellenby et al. | |
| 5,742,815 A | 4/1998 | Stern | |
| 5,926,116 A | 7/1999 | Kitano et al. | |
| 5,945,982 A | 8/1999 | Higashio et al. | |
| 6,009,204 A | 12/1999 | Ahmad | |
| 6,031,545 A | 2/2000 | Ellenby et al. | |
| 6,037,936 A | 3/2000 | Ellenby et al. | |
| 6,084,590 A | 7/2000 | Robotham et al. | |
| 6,085,256 A | 7/2000 | Kitano et al. | |
| 6,175,343 B1 | 1/2001 | Mitchell et al. | |
| 6,278,461 B1 | 8/2001 | Ellenby et al. | |
| 6,289,140 B1* | 9/2001 | Oliver | G10L 15/30 382/313 |
| 6,295,391 B1* | 9/2001 | Rudd | G06F 3/16 381/110 |
| 6,307,556 B1 | 10/2001 | Ellenby et al. | |
| 6,414,696 B1 | 7/2002 | Ellenby et al. | |
| 6,502,000 B1 | 12/2002 | Arnold et al. | |
| 6,522,889 B1 | 2/2003 | Aarnio | |
| 6,604,049 B2 | 8/2003 | Yokota | |
| 6,674,993 B1 | 1/2004 | Tarbouriech | |
| 6,750,848 B1 | 6/2004 | Pryor | |
| 6,765,572 B2 | 7/2004 | Roelofs | |
| 6,771,294 B1 | 8/2004 | Pulli et al. | |
| 6,795,041 B2 | 9/2004 | Ogawa et al. | |
| 6,951,515 B2 | 10/2005 | Ohshima et al. | |
| 6,972,734 B1 | 12/2005 | Ohshima et al. | |
| 7,016,532 B2 | 3/2006 | Boncyk et al. | |
| 7,036,080 B1* | 4/2006 | James | G10L 15/26 704/275 |
| 7,073,129 B1 | 7/2006 | Robarts et al. | |
| 7,119,817 B1 | 10/2006 | Kawakami | |
| 7,156,773 B2 | 1/2007 | Takai et al. | |
| 7,164,117 B2 | 1/2007 | Breed et al. | |
| 7,219,123 B1* | 5/2007 | Fiechter | H04M 1/72561 704/E15.045 |
| 7,283,983 B2 | 10/2007 | Dooley et al. | |
| 7,298,385 B2 | 11/2007 | Kazi et al. | |
| 7,324,081 B2 | 1/2008 | Friedrich et al. | |
| 7,334,728 B2 | 2/2008 | Williams | |
| 7,471,301 B2 | 12/2008 | Lefevre | |
| 7,564,469 B2 | 7/2009 | Cohen | |
| 7,775,437 B2 | 8/2010 | Cohen | |
| 7,903,838 B2 | 3/2011 | Hudnut et al. | |
| 8,386,918 B2 | 2/2013 | Do et al. | |
| 8,483,715 B2 | 7/2013 | Chen | |
| 8,817,045 B2 | 8/2014 | Cohen | |
| 8,903,430 B2 | 12/2014 | Sands et al. | |
| 9,177,225 B1 | 11/2015 | Cordova-Diba et al. | |
| 2002/0044014 A1 | 4/2002 | Wright et al. | |
| 2002/0044104 A1 | 4/2002 | Friedrich et al. | |
| 2002/0044152 A1 | 4/2002 | Abbott et al. | |
| 2002/0061781 A1 | 5/2002 | Tonomura | |
| 2002/0087525 A1 | 7/2002 | Abbott et al. | |
| 2002/0089544 A1 | 7/2002 | Jahn et al. | |
| 2002/0090985 A1 | 7/2002 | Tochner et al. | |
| 2002/0112249 A1 | 8/2002 | Hendricks et al. | |
| 2002/0140745 A1* | 10/2002 | Ellenby | G01C 21/20 715/848 |
| 2002/0190947 A1 | 12/2002 | Feinstein | |
| 2003/0069727 A1* | 4/2003 | Krasny | G10L 15/20 704/228 |
| 2003/0071117 A1 | 4/2003 | Meade | |
| 2003/0073411 A1 | 4/2003 | Meade | |
| 2003/0155413 A1 | 8/2003 | Kovesdi et al. | |
| 2003/0184594 A1 | 10/2003 | Ellenby et al. | |
| 2003/0218638 A1 | 11/2003 | Goose et al. | |
| 2004/0002843 A1 | 1/2004 | Robarts et al. | |
| 2004/0031058 A1 | 2/2004 | Reisman | |
| 2004/0041788 A1 | 3/2004 | Ternullo | |
| 2004/0109009 A1 | 6/2004 | Yonezawa et al. | |
| 2004/0192366 A1 | 9/2004 | Lai et al. | |
| 2005/0007384 A1 | 1/2005 | Yamada et al. | |
| 2005/0009608 A1 | 1/2005 | Robarts et al. | |
| 2005/0015370 A1 | 1/2005 | Stavely et al. | |
| 2005/0168486 A1 | 8/2005 | Sato et al. | |
| 2005/0185060 A1 | 8/2005 | Neven, Sr. et al. | |
| 2005/0231419 A1 | 10/2005 | Mitchell | |
| 2005/0252984 A1 | 11/2005 | Ahmed | |
| 2005/0264555 A1 | 12/2005 | Zhou et al. | |
| 2005/0285878 A1 | 12/2005 | Singh et al. | |
| 2005/0288078 A1 | 12/2005 | Cheok et al. | |
| 2005/0289590 A1 | 12/2005 | Cheok et al. | |
| 2006/0038833 A1 | 2/2006 | Mallinson et al. | |
| 2006/0050142 A1 | 3/2006 | Scott et al. | |
| 2006/0066573 A1 | 3/2006 | Matsumoto | |
| 2006/0152489 A1 | 7/2006 | Sweetser et al. | |
| 2006/0223635 A1 | 10/2006 | Rosenberg | |
| 2006/0241792 A1 | 10/2006 | Pretlove et al. | |
| 2006/0241793 A1 | 10/2006 | Skourup et al. | |
| 2006/0277474 A1 | 12/2006 | Robarts et al. | |
| 2007/0050468 A1 | 3/2007 | Gazit | |
| 2007/0271267 A1 | 11/2007 | Lim et al. | |
| 2007/0273610 A1 | 11/2007 | Baillot | |
| 2007/0273644 A1 | 11/2007 | Mondine | |
| 2008/0021953 A1 | 1/2008 | Gil | |
| 2008/0163329 A1 | 7/2008 | Kitashou | |
| 2008/0189185 A1 | 8/2008 | Matsuo et al. | |
| 2008/0194323 A1 | 8/2008 | Merkli et al. | |
| 2008/0200205 A1 | 8/2008 | Liu et al. | |
| 2009/0102859 A1 | 4/2009 | Athsani et al. | |
| 2009/0300535 A1 | 12/2009 | Skourup et al. | |
| 2010/0045700 A1 | 2/2010 | Lefevre et al. | |
| 2010/0060632 A1 | 3/2010 | Lefevre et al. | |
| 2010/0106720 A1 | 4/2010 | Chao et al. | |
| 2010/0134601 A1 | 6/2010 | Lefevre et al. | |
| 2010/0153111 A1* | 6/2010 | Hirai | B60R 16/0373 704/251 |
| 2010/0220891 A1 | 9/2010 | Lefevre et al. | |
| 2010/0277468 A1 | 11/2010 | Lefevre et al. | |

(56) References Cited

U.S. PATENT DOCUMENTS

| | | | |
|---|---|---|---|
| 2011/0131241 A1 | 6/2011 | Petrou et al. | |
| 2013/0013414 A1 | 1/2013 | Haff | |
| 2013/0046602 A1 | 2/2013 | Grigg et al. | |

FOREIGN PATENT DOCUMENTS

| | | | |
|---|---|---|---|
| GB | 2385486 | A | 8/2003 |
| JP | H1166350 | A | 3/1999 |
| JP | 2001087559 | A | 4/2001 |
| JP | 2005143075 | A | 6/2005 |
| WO | 9846323 | A1 | 10/1998 |
| WO | 9967695 | A2 | 12/1999 |
| WO | 0158547 | A1 | 8/2001 |
| WO | 0217090 | A1 | 2/2002 |
| WO | 2009112585 | A1 | 9/2009 |
| WO | 2009112586 | A1 | 9/2009 |

OTHER PUBLICATIONS

Russell B., "Use Your Phone as a Golf Club," MobHappy, 1 page, [retrieved on Jan. 31, 2005]. Retrieved from the Internet:< URL: http:// mobhappy_typepad_com/russell_buckleys_mobhappy/2005/01/index.html>.

Snow B., "GPS Gaming," Joystiq.com, 1 page, [retrieved on Feb. 24, 2006]. Retrieved from the Internet< URL: http://www.joystiq.com/ 20061021241gps-gaming/>.

Supplementary European Search Report for Application No. EP06790088, dated May 26, 2011, 11 pages.

Welle D., "Virtual Graffiti—A Sign of the Future?," 2 pages, [retrieved on Feb. 14, 2005]. Retrieved from the Internet:<URL: http://www. dw-world.de/dw/article/0,1564,1481993,00.html>.

European Search Report for Application No. EP14166069, dated Nov. 6, 2014, 10 pages.

Partial European Search Report for Application No. EP14166069, dated Jul. 4, 2014, 6 pages.

\* cited by examiner

INTERACTIVITY WITH A MIXED REALITY

This application is a Divisional of U.S. application Ser. No. 12/505,726, filed Jul. 20, 2009, which is a continuation of U.S. application Ser. No. 11/972,062 filed Jan. 10, 2008, which is a continuation-in-part of PCT Application Serial No. PCT/US06/33811 filed Aug. 29, 2006, which claims priority to U.S. Provisional Application No. 60/712,590 filed Aug. 29, 2005. These and all other extrinsic references are incorporated herein by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is mixed reality technologies.

BACKGROUND

Virtual reality systems are having an ever increasing impact on our daily lives. Virtual world games, for example, continue to dominate the gaming industry and are migrating to mobile devices of all sorts including cell phones. Just as virtual worlds are impacting our real lives, the real world will have an ever growing impact on our virtual lives. The distinction between virtual worlds and the real world will continue to become ever more blurry resulting in an ever present mixed reality. People living with the various mixed realities will interact with mixed reality objects whether they are real, virtual, or a mix of both. To date there are no easy, intuitive methods for a person to command or control mixed reality objects.

Google Maps™ provides a method for people to interact with a mixed reality where real-world satellite images are superimposed over computer generated images showing location or road names. Although Google Maps is useful for interacting with maps and for virtual travel, it does not address command or control of mixed reality objects.

U.S. Pat. No. 6,502,000 to Arnold et al. offers a system for controlling real-world devices through a communication link between a controlled device and a controlling device but does not address the need for interacting with virtual objects of a mixed reality. The Arnold approach is useful for closed ecosystems where all devices use a common control protocol. However, the approach does not lend itself to a universal, heterogeneous environment where mixed reality objects employ multiple command or control protocols.

The mixed reality system described by U.S. Pat. No. 6,604,049 to Yokota teaches that a person can interact with a mixed reality by accessing and displaying information about a real-world object on a virtual reality display device worn by the person. A camera captures images of surrounding objects and sends the image data to a remote server for processing. The server then returns information associated with the objects for display on the user's display screen. Although useful for obtaining information about real-world objects, the system does not teach how to command or control mixed reality objects. Additionally, it is unlikely individuals will purchase or wear the contemplated virtual reality system as opposed to using a system the individual already owns, possibly a cell phone or PDA.

U.S. Publication No. 2002/0090985 to Tochner et al. further advances mixed reality interactions by teaching that a player of a virtual world game can interact with the real-world by establishing a correspondence between virtual objects and real-world objects. Still, Tochner does not provide for the command or control of mixed reality objects.

The applicant's patent U.S. Pat. No. 7,016,532 and patent applications U.S. Publication Nos. 2004/0208372, 2006/0002607, 2006/0110034, and 2006/0181605 teach that one can use a mobile device to capture image data associated with a real-world object to access information about the real-world object. The image data is used to identify network addresses where information associated with the real-world objects can be obtained. The network addresses can also be used to perform an action relating to the real-world objects. Although the applicant's previous filings teach performing an action associated with a returned network address and controlling real-world objects, those filings do not teach how to command or control mixed reality objects.

What has not yet been appreciated is that a mobile device can provide an interface to command or control mixed reality objects by capturing an image of a real-world object. Thus, there is still a need for systems and methods for interacting with mixed realities.

SUMMARY OF THE INVENTION

The present invention provides apparatus, systems and methods in which a mobile device can be used to command or control objects within mixed realities.

One can interact with a mixed reality by capturing an image of a real-world object using a mobile device where content from the image is used to derive a command set for a mixed reality object that is accessible by the mobile device. The mixed reality object can include a virtual object in a virtual world, a second real-world object, or an object having presence within a virtual world and the real world. Command sets are contemplated to have commands including changing channels, turning a device on or off, or inputting data.

As used herein, "real-world objects" are those that have mass and extent in the physical world, and "virtual objects" are those that do not have mass and extent in the physical world. The term "mixed reality" means a reality having at least one real-world object and at least one virtual object, which a user of the mixed reality space can perceive as interacting with one another in some manner.

Mixed realities cover the spectrum from slight modifications of the physical world where virtual elements are superimposed on the real world, to fully virtual worlds where a real-world object has a corresponding presence in the virtual world. In general, a mixed reality requires support from an electronic interface, possibly a cell phone or PDA, to view or access the mixed reality. The real-world itself is not a mixed reality because there are no virtual elements. Many computer games per se are virtual realities, but they are not mixed-realities because they are self contained and do not share real-world elements. Other computer games supporting virtual worlds can represent a mixed-reality when a real-world object has a corresponding presence within the game world including trading cards, money, avatars, or other representations of real-world elements. An example of a mixed reality weighted heavily toward the virtual end of the spectrum includes, Linden Lab's Second Life® where real-world dollars correspond to money in Second Life.

A "mixed reality object" is an object within a mixed reality capable of interacting with other objects in the mixed reality. A physical television per se is a real-world object and not a mixed reality object, even though it can be used to display virtual or mixed reality content. The physical television set can be part of a mixed reality when it has a corresponding presence in a mixed reality space. For example, if a user turns off the physical television, the corresponding presence in the mixed reality space could be shown as having been turned off.

Various objects, features, aspects and advantages of the inventive subject matter will become more apparent from the following detailed description of preferred embodiments, along with the accompanying drawings in which like numerals represent like components.

DETAILED DESCRIPTION

Mixed Reality Environment

Figure 1B:
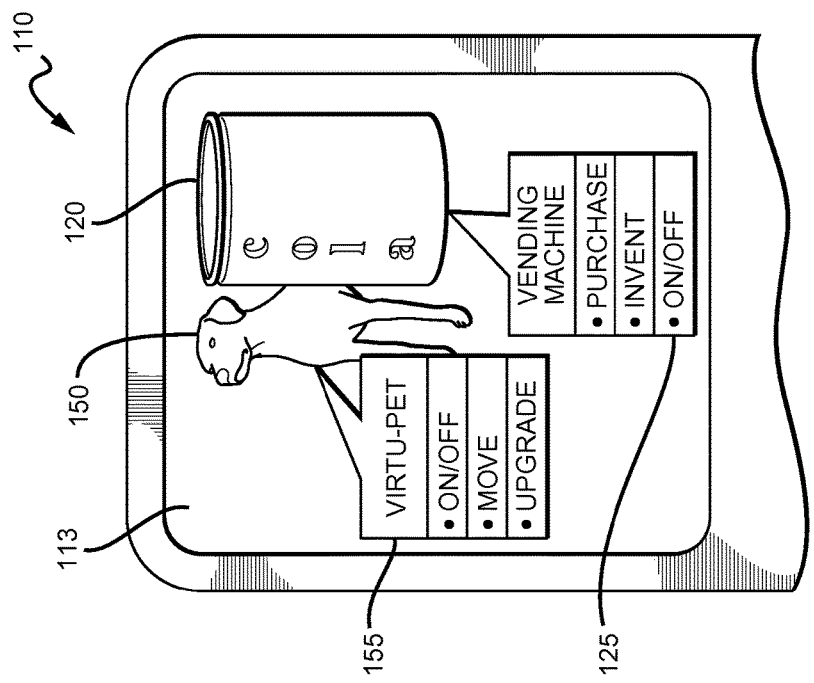
FIG. 1B is a schematic of the mobile device of FIG. 1, displaying an image of a mixed reality world that includes a portion of the image data, and command sets associated with one or more objects in the mixed reality objects.
Figure 1A:
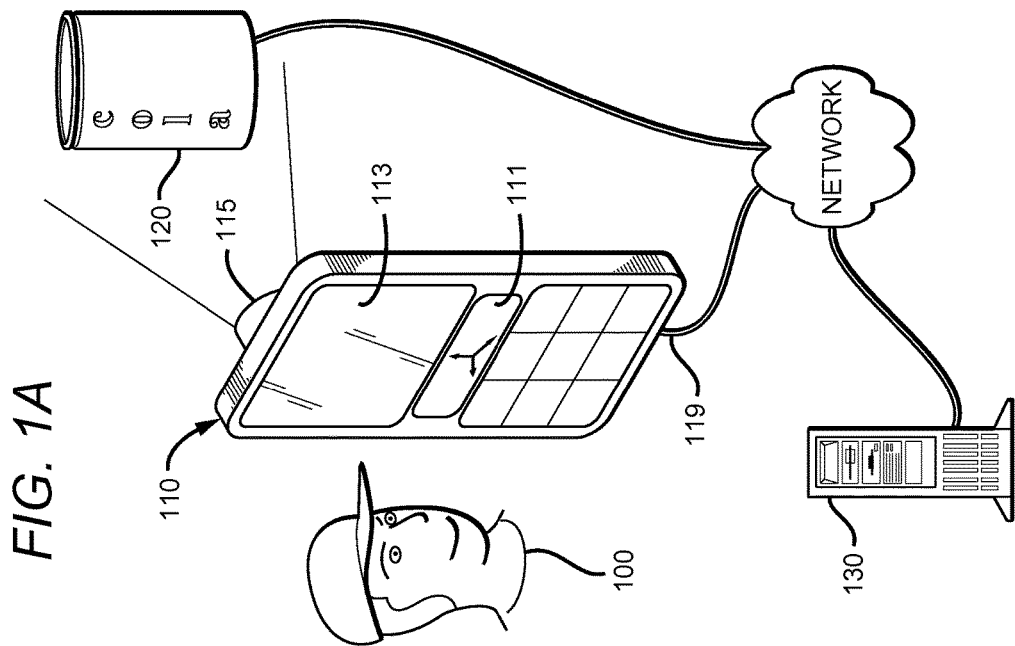
FIG. 1A is a schematic of a user using a mobile device to capture image data of a real-world object.

In FIG. 1A, user 100 interacts with a mixed reality environment that includes real-world object 120.

In a preferred embodiment, user 100 uses mobile device 110 as a command or control interface for mixed reality objects that are local to mobile device 110. Although the terms "local" and "locality" are context dependent, as used herein two objects are considered "local" to each other when they are physically or virtually near each other. Physically local objects are generally within about 100 meters of each other. More preferably, objects are considered local when they are within 10 meters of each other. It is also contemplated that a user could interact with objects that are more than 100 meters from mobile device 110.

Virtual objects are preferably within visual range of each other in the mixed reality. It is also contemplated that virtual objects could be hidden from view, yet remain in visual range. For example, a virtual pet that can only be seen using mobile device 110 might be hiding behind a real-world car, yet the virtual pet is still virtually local to mobile device 110.

Although a preferred embodiment calls for mobile device 110 to command or control local mixed reality objects, the techniques disclosed can also be applied to remote mixed reality objects which also fall within the scope of the inventive subject matter.

Mobile device 110 comprises display 113, camera 115, and network connection 119. Through the use of these elements, mobile device 110 generally becomes an interface portal into the mixed reality utilizing support from software running at least partially on external computer systems. One should appreciate that mobile device 110 or its abstracted interface, can be considered an object within the mixed reality.

Display 113 is contemplated to include a GUI (Graphical User Interface) that can display image data or user interfaces. User 100 interacts with the mixed reality through the interface rendered by display 113. Typically, display 113 comprises an LCD (Liquid Crystal Display) as used in computers, cell phones, PDAs, or other similar devices. Additionally mobile device 110 preferably runs a browser application or other GUI for rendering graphics or command interfaces on display 113. In some embodiments, display 113 renders the real-world object along with virtual objects that are objects in the mixed reality. It is also contemplated that display 113 could comprise non-visual displays for use by other senses. For example, a blind person could use a tactile display to interact with a mixed reality as opposed to a visual-based display or a deaf person could use an auditory interface system to interact with a mixed reality.

Camera 115 captures image data of real-world object 120 by capturing still images, video images, streamed images, or other image data. CCD cameras as typically used in hand-held device are a contemplated form of camera. Any camera capable of electronically capturing image data would also be suitable. The image data can be captured through manually snapping a single still frame, recording audio or video, or simply by having the camera stream real-time images. In some embodiments, camera 115 has advantageous features including zoom, infrared sensitivity, or ultraviolet sensitivity which can increase the amount of information obtained relating to real-world object 120.

Image data of real-world object 120 captured by camera 115 combines with additional data obtained over network connection 119, possibly from computer 130 or real-world object 120, to create a interactive view of the mixed reality. The additional data can also be obtained by mobile device 110 and can include time, temperature, location (e.g. latitude or longitude), or other information.

Network connection 119 preferably utilizes standard Internet related protocols including TCP, UDP, IP, HTTP, wired protocols, wireless protocols, or other communication protocols; although all communication protocols are contemplated. Mobile device 110 uses network connection 119 to communicate with other devices or mixed reality objects external to mobile device 110 including real-world object 120 (if it is so enabled) or computer 130.

Mobile device 110 can also comprise optional sensor 111. Sensor 111 acquires additional data about mobile device 110 or real-world object 120 for use in interacting with the mixed reality. Contemplated sensors include audio sensors, accelerometers, orientation sensors, GPS (Global Positioning System) or other physical location sensors, or other sensors beyond camera 115. Additional sensor 111 provides information that can be used by software to further identify attributes associated with real-world object 120 through the location or the orientation of mobile device 110. Accelerometers provide motion information that can be used to determine how the mobile device moves relative to real-world object 120 which can be used to alter the visual display of virtual objects or can be used as command inputs to control objects. For example, U.S. Pat. No. 7,271,795 to Bradski describes a suitable method for using sensor input to alter a visual display when interacting with a virtual space.

Mobile device 110 is preferably a hand-held device including a cell phone, a PDA, a remote control, a hand-held computer, or other similar portable device. It is also contemplated that mobile device 110 could include larger, non-hand-held devices. For example, mobile device 110 could be a vehicle, potentially a police car, equipped with a camera, a display, or a network connection. A police car so equipped can aid police officers by automatically viewing a license plate, for example, and providing the office with a list of commands relating to the car, the driver, the driver's record, or other real or virtual objects.

Real-world object 120 can be any object in the real world that can be imaged whether it is a machine, a person, a building, a plant, a set of objects, or other physical items. In embodiments where real-world object 120 is a machine, it is contemplated that real-world object 120 also communicates with computer 130 to support interactions with the mixed reality.

One should note that real-world object 120 does not necessarily have to be electronic or mechanical to be commanded or controlled within a mixed reality. Real-world object 120 could be co-existent with a virtual object within a virtual world where the virtual representation of real-world object 120 can be commanded or controlled. Consider, for example, a virtual game where a real world fire hydrant corresponds to a virtual fire hydrant in the virtual game world. Although a real player cannot operate the real fire hydrant, the player could capture image data of the real fire hydrant and then command or control the corresponding virtual fire hydrant as part of the game.

Real-world object 120 is also contemplated to include multiple parts that can be controlled individually or collectively through an image of at least a portion of the object. For example, a stereo system represents a multi-part object that could include a CD player, speakers, a tuner, a graphical analyzer, or other parts. When image data of the stereo is captured, one or more virtual interfaces, each having a command set, can be superimposed over the image of the stereo or its individual parts. The act of combining the virtual interface with the image data from the real-world essentially forms a mixed reality representation of the stereo.

Computer 130, external to mobile device 110, runs software for analyzing image data to recognize attributes associated with real-world object 120. The preferred embodiment employs techniques similar to those described in co-owned U.S. Pat. No. 7,016,532 where a remote service identifies network addresses associated with a target object and returns the network address to a mobile device.

The software running on computer 130 communicates with software on mobile device 110 and, potentially, with software running on real-world object 120 to support the structure of the mixed reality environment. It is also contemplated that computer 130 can be incorporated into real-world object 120.

Computer 130 can be one of any of a full spectrum of computer resources. At the real-world end of the mixed reality spectrum, computer 130 can comprise a web server or database that supplies command or control information to mobile device 110. At the other end of the mixed reality spectrum where the virtual aspects dominate the mixed reality, computer 130 can include a virtual world server or a game server that supply virtual world environment information for use by mobile device 110.

Mixed Reality Interface

In FIG. 1B, mobile device 110 displays a mixed reality interface on display 113. The mixed reality interface can include an image of real-world object 120 having command set 125, or virtual object 150 having command set 155.

Mobile device 110 uses camera 115 to capture image data of real-world object 120 and sends at least a portion of the image data, attributes, or other optional information from sensor 111 to external computer 130 where attributes associated with real-world objects 120 are identified.

As previously mentioned, computer 130 uses the attributes to identify one or more network addresses or other commands using techniques similar to those described in U.S. Pat. No. 7,016,532. The techniques are extended to include any virtual objects within the mixed reality that are accessible to mobile device 110. Computer 130 returns information associated with one or more of the mixed reality objects (either real or virtual) to mobile device 110 including data necessary for rendering virtual object on display 113.

Consider a case where the local object is a real object. Attributes from the image data associated with real-world object 120 are identified and used by the software to offer command set 125 to control real-world object 120 which can be physically local to mobile device 110. As shown in FIG. 1B, real-world object 120 can include a vending machine. One should note that term "offer" is used euphemistically to mean expose or otherwise provide access to command set. A user, mobile device 110, or other entity interacts with the vending machine by interfacing with command set 125 listing one or more vending machine commands. Contemplated commands include purchasing an item or possibly checking the inventory of the machine. Other contemplated commands include those that might require proper authentication including turning the vending machine on or off. One should appreciate that the commands are not limited to those described within this document and that all possible mixed reality objects commands are contemplated.

Also consider the case where a mixed reality object is a virtual object. Again, attributes derived from the image data or optional sensor data are used to by the software to determine if there are virtual objects local to mobile device 110 within the mixed reality. The software also uses the attributes or optional sensor data to offer command set 155. Command set 155 offers one or more commands to control virtual object 150 which, as shown in FIG. 1B, can include a virtual pet. Example commands for virtual object 150 include turning the virtual object on or off, instructing the object to move, upgrading the object, or any other command that can alter the operation of virtual object 150. One should also appreciate that virtual objects remote to mobile device 110 can also be controlled.

In some embodiments, the software on computer 130 runs in conjunction with software on mobile device 110 to ensure virtual objects are displayed in proper relation to real objects. For example, virtual object 150 can be rendered in a manner where it is partially hidden by real-world object 120 even though the virtual object does not exist in the real world and is not part of the original image data.

One should appreciate that in a mixed reality, virtual objects and real objects co-exist on equal footing as if they are both natural to the mixed reality. Therefore, the manner in which one interfaces to a virtual object of the mixed reality using mobile device 110 is substantially identical to the manner in which one interfaces to a real object. Even though the infrastructure for a mixed reality system might treat real and virtual objects differently; the user interface of each type of object is preferably similar so that a user experiences both types of objects as being natural to the mixed reality.

Command sets 125 and 155 preferably include one or more commands. A command set can be displayed using any suitable types of command prompts including menus, radio buttons, simple list of one or more commands, drop-down lists, command line prompt, icons that open to reveal the command set, graphical controls, or other types of command offerings. Contemplated command input mechanism to access a command include calling an API, handset motion, stylus, rocker buttons, voice commands, or other input methods.

It is also contemplated that a command set can be hidden from the user, but yet is still accessible through mobile device 110. Consider the example where real-world object 120 is a vending machine. Command set 125 for the vending machine might not be visible to the user while mobile device 110 is still aware of command set 125. A user could access command set 125 by interacting directly with the image of the vending machine, including "clicking" on the image of one of the vending machine buttons. Alternatively, mobile device 110 could access command set 125 automatically using one or more API calls without direct interaction with the user. Furthermore it is also contemplated that other remote devices (e.g. computer 130) could also access command set 125 to control the mixed reality object.

One should also appreciate that the command bubbles displaying command sets 125 and 155 are objects of the mixed reality. It is, therefore, contemplated that as a user pans, tilts, or otherwise moves mobile device 110, the command set can also optionally move within display 113 to stay in proper relation to object within the mixed reality view.

In a preferred embodiment, the commands in a command set comprise one or more network addresses obtained from computer 130. The network address can include URLs, URIs, remote procedure calls, email addresses, IP addresses, web service APIs, or other network callable commands or addresses. When a user selects a command from the command set, preferably mobile device 110 executes the command by issuing a call to the corresponding network address. In some embodiments, the network address points to a function on computer 130, possibly where computer 130 is running as a web server or a virtual world server. In other embodiments, the network address points to an accessible function on real-world object 120, or other mixed reality object accessible by mobile device 120. Although the preferred embodiment employs web services, it is also contemplated that other types of command services can also be used including email, FTP, Telnet, proprietary services, or other services capable of executing a command. It is also contemplated that a command associated with a virtual object can be at least partially executed internal to mobile device 110 as opposed to executing on a remote computer system.

Mixed Reality Interactions

Figure 2:
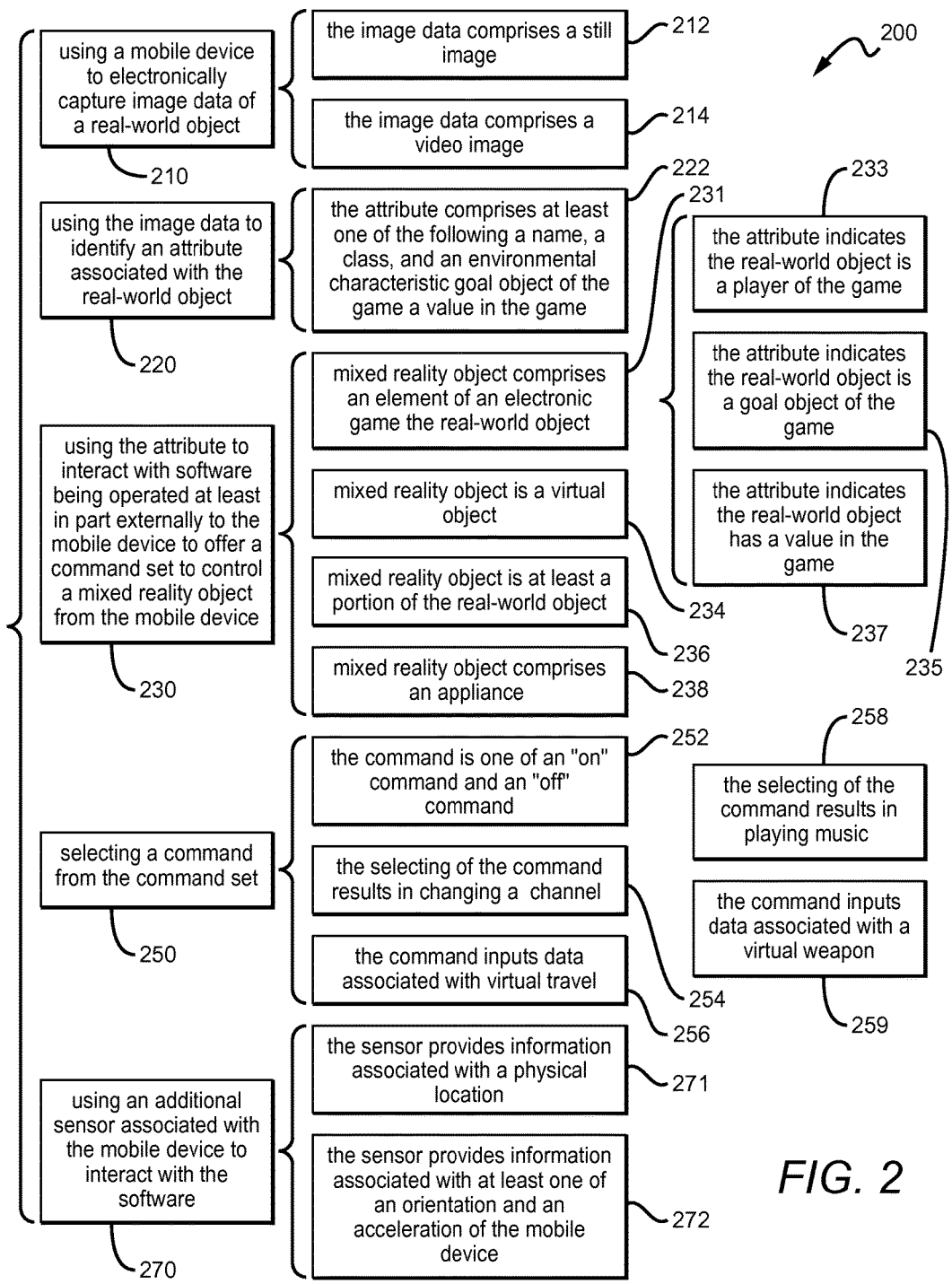
FIG. 2 is a schematic of methods for interacting with a mixed reality.

In FIG. 2, method 200 describes how one can interact with a mixed reality.

At step 210 a mobile device is preferably used to electronically capture image data of a real-world object. The real-world object is considered to have mass and extent and actually exist in the physical world. A real-world object can include anything that can be photographed including a person, a place, or a thing. Image data is contemplated to comprise at least a still image at step 212 or a video image at step 214. One should note that a projected image is not considered a real-world object because is lacks mass, but is rather considered a virtual object. However, a photograph, a mural, a poster, a magazine advertisement or other physically rendered image is considered to be a real-world object. Although a preferred embodiment captures image data of a real-world object, it is also contemplated that one could capture image data of a virtual object without significantly departing from the inventive subject matter.

At step 220 attributes of the real-world object are identified from the image data. In some embodiments, the mobile device comprises software to derive the attribute, however, in preferred embodiments the image data is transmitted to a remote computer which identifies the attributes. It is also contemplated that any combination of software applications, local or remote to the mobile device, can be used to derive the attributes.

Attributes include metadata associated with the content of the image data, and relate to objects in the image. Attributes are used to identify or to derive a command set associated with various mixed reality objects accessible by a mobile device. At step 222, preferred attributes include a name, a class, or an environmental characteristic associated with a real-world object.

Names are useful when offering a specific command set for a target object. For example, if a user captures an image of a Xerox® 4150PS printer, then the name "Xerox 4150PS" can be used to access specific 4150PS command functions and provide them to the user.

Classes represent broad categories of objects. To continue the previous printer example, an appropriate class for the Xerox printer is "printer". Classifying objects provides for offering generic commands that are common across many types of objects or devices. A common set of commands for many appliances include "on" or "off" commands. In a preferred embodiment, classes are organized hierarchically as in a classic object oriented programming methodology.

Environmental characteristic are attributes that indicate the environmental condition in which the real-world object exists. Examples include weather conditions, time of day, geographic location, or other environmental information. Environmental characteristics are advantageously used to adjust command sets to meet the potential needs of a user or alter the behavior of the mixed reality. For example, on a hot day when interacting with a vending machine that exists in a mixed reality (e.g. having at least a portion of the vending machine represented as a virtual object in the mixed reality), a user could observe that a virtual entity in the mixed reality, perhaps in a game, also suffers from the heat and requires a drink. Such an approach can be used for vendor promotions or other forms of advertising within a mixed reality.

A step 230 the attributes are used to interact with software that is located at least partially external to the mobile device. The software determines an appropriate command set as a function of the attributes or other sensor data for one on or more mixed reality objects that are accessible by the mobile device. Preferably, software running on a computer external to the mobile devices uses the attributes to consult a database having command set information. It is also contemplated that a database of command set information can be located within or accessed from a real-world object.

The mixed reality object for which the command set is offered can very significantly without departing from the inventive subject matter. For example, the mixed reality object can include a virtual object, a portion of the real-world object, or an appliance (e.g. kitchen appliance, consumer electronics, set-top box, TV, or other electronic device) as indicated at steps 234, 236, and 238, respectively. Contemplated appliances include those associated with kitchens, business offices, consumer electronics, clinics, or other functional devices.

Additionally, at step 231 the local mixed reality object comprises an element of a game where the game element can also be a real or virtual object. Obtaining a command set associated with the game elements allows for a user of the mobile device to fully interact with a mixed reality game.

In some gaming embodiments, including at step 234, the real-world object is a player of the game. When a user captures image data of the player, the user can be offered a set of game related commands that can affect the player. Contemplated commands include attack, add player, delete player, or other game related commands.

In other embodiments relating to games, as at step 235, the real-world object can represent a goal object of the game. Contemplated games having goal objects include virtual tag, scavenger hunts, geo-caching, hide-and-seek, or other games having goal objects. Again, such an approach provides for promotions or other advertising efforts.

In yet other gaming embodiments, at step 237 the real-world object can have value within the game system. For example, an image of an advertisement could result in points added to a player's score or, perhaps, unlock additional commands that can then be used within the game or with game objects.

Preferred embodiments also optionally allow a user to select a command from the command set at step 250. Contemplated commands include:

At step 252 turning a device on or off by selecting an "on" command or an "off" command At step 254 changing a channel or station of a TV, radio, or other appliance.

At step 256 inputting data associated with virtually traveling to a new place where the place can be a real or virtual location.

At step 258 playing music.

At step 257 inputting data associated with a virtual weapon.

At step 270, the mobile device can optionally include an additional sensor other than a camera. The additional sensor data acquired by the mobile device can also be used to interact with external software to aid in determining a desired command set. At step 271 the sensor data optionally provides information associated with a physical location (e.g. latitude or longitude), preferably from a GPS receiver. At step 272 the sensor data optionally provides information associated with orientation or acceleration of the mobile device preferably from an accelerometer, a gyroscope, a compass, or other sensor.

One skilled in the art should now appreciate the numerous advantages provided by the disclosed subject matter for interacting with a mixed reality. The disclosed methods provide an easy, intuitive method for a person to command and control mixed reality objects. Using a cell phone or PDA offers a ubiquitous interface with which most people familiar. Users simply capture image data of an object and then select a command from an offered command set to control various mixed reality objects or automatically control the mixed reality objects.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A method for enabling a user of a mobile computing device to use image sensor data and audio sensor data for interactions, the method comprising the steps of:

capturing, from an image sensor of a mobile device, image sensor data relating to a plurality of real-world objects;

identifying, by the mobile device in cooperation with a server, a first set of attributes associated with a first real-world object and a second set of attributes associated with a second real-world object from the plurality of real-world objects, based on the captured image sensor data;

providing, by the mobile device to the server, the first set of attributes and the second set of attributes;

determining, by the server, a first command set based on the first set of attributes and a second command set based on the second set of attributes from a database storing a plurality of command sets corresponding to a plurality of real-world objects, wherein the first and second command sets comprise commands that control functions of the first and the second real-world objects, respectively;

supplying, by the server, the first command set and the second command set to the mobile computing device;

making accessible, by the mobile computing device, the first command set and the second command set to the user; and receiving, by the mobile computing device, a user-selected command from one of the first command set and the second command set, wherein the user-selected command is executable by the mobile computing device to control an accessible function of the respective first or second real-world object.

2. The method of claim 1, wherein the mobile computing device comprises a cell phone.

3. A system for using image sensor data and audio sensor data for interactions, the system comprising:

a server communicatively coupled with a mobile device and a database storing a plurality of command sets corresponding to a plurality of real-world objects;

wherein the mobile device comprises an image sensor configured to capture image sensor data and an audio sensor configured to capture audio sensor data;

wherein the mobile device is configured to:

identify, in cooperation with the server, a first set of attributes associated with a first real-world object and a second set of attributes associated with a second real-world object by using the image sensor data captured by the image sensor of the mobile device; and provide the first set of attributes and second set of attributes to the server;

wherein the server is configured to determine a first command set based on the first set of attributes and a second command set based on the second set of attributes from a database storing a plurality of command sets corresponding to a plurality of real-world objects, wherein the first and second command sets comprise commands that control functions of the first and the second real-world objects, respectively; and wherein the mobile device is further configured to:

receive the first command set and the second command set from the server;

make the first command set and the second command set accessible to a user; and receive a user-selected command from one of the first command set and second command set, wherein the user-selected command is executable by the mobile device to control an accessible function of the respective first or second real-world object.

4. The system of claim 3, wherein the mobile device comprises a cell phone.

5. A system for using image sensor data and audio sensor data for interactions, the system comprising:

a server communicatively coupled with a mobile device and a database storing a plurality of command sets corresponding to a plurality of real-world objects;

wherein the mobile device comprises an image sensor configured to capture image sensor data and an audio sensor configured to capture audio sensor data;

wherein the mobile device is configured to:

identify, in cooperation with the server, a first set of attributes associated with a first real-world object and a second set of attributes associated with a second real-world object by using the image sensor data captured by the image sensor of the mobile device and at least one of GPS sensor data and location information; and provide the first set of attributes and the second set of attributes to the server;

wherein the server is configured to determine a first command set based on the first set of attributes and the at least one of GPS sensor data and location information and a second command set based on the second set of attributes and the at least one of GPS sensor data and location information from a database storing a plurality of command sets corresponding to a plurality of real-world objects, wherein the first and second command sets comprise commands that control functions of the first and the second real-world objects, respectively; and wherein the mobile device is further configured to:

receive the first command set and second command set from the server;

make the first command set and the second command set accessible to the user; and receive a user-selected command from one of the first command set and second command set, wherein the user-selected command is executable by the mobile to control an accessible function of the respective first or second real-world object.

6. A system for using image sensor data and audio sensor data for interactions, the system comprising:

a server communicatively coupled with a mobile device and a database storing a plurality of command sets corresponding to a plurality of objects;

wherein the mobile device comprises an image sensor configured to capture image sensor data and an audio sensor configured to capture audio sensor data;

wherein the mobile device is configured to:

identify, in cooperation with the server, a first set of attributes associated with a first real-world object and a second set of attributes associated with a second real-world object by using the image sensor data captured by the image sensor of the mobile device and GPS sensor data; and provide the first set of attributes and the second set of attributes to the server;

wherein the server is configured to determine a first command set based on the first set of attributes and a second command set based on the second set of attributes from a database storing a plurality of command sets corresponding to a plurality of real-world objects, wherein the first and second command sets comprise commands that control functions of the first and the second real-world objects, respectively; and wherein the mobile device is further configured to:

receive the first command set and the second command set from the server;

make the first command set and the second command set accessible to the user; and receive a user-selected command from one of the first command set and second command set, wherein the user-selected command is related to a time and executable by the mobile device to control an accessible function of the respective first or second real-world object.

7. A system for using image sensor data and audio sensor data for interactions, the system comprising:

a server communicatively coupled with a mobile device and a database storing a plurality of command sets corresponding to a plurality of objects;

wherein the mobile device comprises an image sensor configured to capture image sensor data and an audio sensor configured to capture audio sensor data;

wherein the mobile device is configured to:

identify, in cooperation with the server, a first set of attributes associated with a first real-world object and a second set of attributes associated with a second real-world object by using the image sensor data captured by the image sensor of the mobile device; and provide the first set of attributes and the second set of attributes to the server;

wherein the server is configured to determine a first command set based on the first set of attributes and a second command set based on the second set of attributes from a database storing a plurality of command sets corresponding to a plurality of real-world objects, wherein the first and second command sets comprise commands that control functions of the first and the second real-world objects, respectively; and wherein the mobile device is further configured to:

receive the first command set and the second command set from the server;

make the first command set and the second command set accessible to the user; and receive a user-selected command from one of the first command set and second command set, wherein the user-selected command is related to a time executable by the mobile device to control an accessible function of the respective first or second real-world object.

8. The system of claim 5, wherein the mobile device comprises a cell phone.

9. The system of claim 6, wherein the mobile device comprises a cell phone.

10. The system of claim 7, wherein the mobile device comprises a cell phone.

11. The method of claim 1, wherein at least one of the first real-world object and the second real-world object comprises a vending machine.

12. The system of claim 3, wherein at least one of the first real-world object and the second real-world object comprises a vending machine.

13. The system of claim 5, wherein at least one of the first real-world object and the second real-world object comprises a vending machine.

14. The system of claim 6, wherein at least one of the first real-world object and the second real-world object comprises a vending machine.

15. The system of claim 7, wherein at least one of the first real-world object and the second real-world object comprises a vending machine.

16. The method of claim 1, wherein at least one of the first real-world object and the second real-world object comprises a stereo system, a printer, a kitchen appliance, a consumer electronics device, a set-top box, or a television.

17. The system of claim 3, wherein at least one of the first real-world object and the second real-world object comprises a stereo system, a printer, a kitchen appliance, a consumer electronics device, a set-top box, or a television.

18. The system of claim 3, wherein at least one of the first real-world object and the second real-world object comprises a stereo system, a printer, a kitchen appliance, a consumer electronics device, a set-top box, or a television.

19. The system of claim 5, wherein at least one of the first real-world object and the second real-world object comprises a stereo system, a printer, a kitchen appliance, a consumer electronics device, a set-top box, or a television.

20. The system of claim 6, wherein at least one of the first real-world object and the second real-world object comprises a stereo system, a printer, a kitchen appliance, a consumer electronics device, a set-top box, or a television.

21. The system of claim 7, wherein at least one of the first real-world object and the second real-world object comprises a stereo system, a printer, a kitchen appliance, a consumer electronics device, a set-top box, or a television.

\* \* \* \* \*